(12) United States Patent
Uthe (10) Patent No.: US 7,552,447 B2
(45) Date of Patent: Jun. 23, 2009

(54) SYSTEM AND METHOD FOR USING ROOT CAUSE ANALYSIS TO GENERATE A REPRESENTATION OF RESOURCE DEPENDENCIES

(75) Inventor: Robert Thomas Uthe, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 1161 days.

(21) Appl. No.: 10/854,042

(22) Filed: May 26, 2004

(65) Prior Publication Data

US 2005/0278273 A1    Dec. 15, 2005

(51) Int. Cl.
  G06F 3/00   (2006.01)
  G06F 9/44   (2006.01)
  G06F 9/46   (2006.01)
  G06F 13/00  (2006.01)
  G06F 11/00  (2006.01)

(52) U.S. Cl. .................... 719/318; 714/100; 714/25; 714/47; 714/48

(58) Field of Classification Search ............... 719/318; 714/100, 25–26, 47–48; 706/47; 709/224; 715/853; 717/104–105
  See application file for complete search history.

(56) References Cited

U.S. PATENT DOCUMENTS

| | | | |
|---|---|---|---|
| 6,226,693 B1 | 5/2001 | Chow et al. | 709/318 |
| 6,249,755 B1 | 6/2001 | Yemini et al. | 702/183 |
| 6,336,138 B1 * | 1/2002 | Caswell et al. | 709/223 |
| 6,393,386 B1 * | 5/2002 | Zager et al. | 703/25 |
| 6,446,136 B1 | 9/2002 | Pohlmann et al. | 709/318 |
| 6,707,795 B1 * | 3/2004 | Noorhosseini et al. | 370/242 |
| 7,028,228 B1 * | 4/2006 | Lovy et al. | 714/57 |
| 7,069,480 B1 * | 6/2006 | Lovy et al. | 714/57 |
| 7,076,695 B2 * | 7/2006 | McGee et al. | 714/47 |
| 7,299,278 B2 * | 11/2007 | Ch'ng | 709/224 |

(Continued)

FOREIGN PATENT DOCUMENTS

WO    WO 03/005200    1/2003

OTHER PUBLICATIONS

Thoenen, David et al., "Event Relationship Networks: A Framework for Action Oriented Analysis in Event Management", IBM Research Report, Sep. 2000, pp. 1-16.*

(Continued)

*Primary Examiner*—Thomas Lee
*Assistant Examiner*—Qing-Yuan Wu
(74) *Attorney, Agent, or Firm*—Yee & Associates, P.C.

(57) ABSTRACT

A system and method for using event management root cause analysis to depict resource dependencies are provided. With the system and method, since the root cause analysis of known event management systems provides a mechanism for defining interactions of enterprise components for root cause analysis purposes, this information is used as a basis for obtaining enterprise component relationship information that may be used by other management applications. That is, the system and method monitor the application of correlation rules to event notifications from various enterprise components and determine relationships of the various enterprise components based on the results of the application of the correlation rules. These relationships may then be stored in a data structure representing the system environment and may be used by other management systems or displayed to the user in a graphical format that graphically represents the system environment.

3 Claims, 5 Drawing Sheets

U.S. PATENT DOCUMENTS

| | | | |
|---|---|---|---|
| 2002/0120734 A1 | 8/2002 | Riosa et al. | 709/224 |
| 2002/0152185 A1* | 10/2002 | Satish Jamadagni | 706/1 |
| 2003/0074440 A1 | 4/2003 | Grabarnik et al. | 709/224 |
| 2004/0049372 A1* | 3/2004 | Keller | 703/22 |
| 2004/0049565 A1* | 3/2004 | Keller et al. | 709/223 |

OTHER PUBLICATIONS

IBM Technical Disclosure Bulletin, "Input/Output Event Analysis", Jul. 1997, pp. 117-128.

IBM Technical Disclosure Bulletin, "Resource Managers", Jul. 1973, pp. 477.

* cited by examiner

SYSTEM AND METHOD FOR USING ROOT CAUSE ANALYSIS TO GENERATE A REPRESENTATION OF RESOURCE DEPENDENCIES

BACKGROUND OF THE INVENTION

1. Technical Field

The present invention is generally directed to an improved data processing system. More specifically, the present invention is directed to a system and method for using root cause analysis to determine the dependencies of resources in a complex data processing system to thereby generate a representation of the resource dependencies.

2. Description of Related Art

Enterprises employ large, complex, computing environments that include a number of enterprise components, e.g., servers, routers, database, mainframes, personal computers, intelligent agents, business applications, etc. Systems that monitor complex enterprise computing environments are generally known in the art and may rely on enterprise components generating and reporting events when they experience problems, e.g., a disk crash, server crash, network congestion, database access failure, etc. However, when a first enterprise component experiences a problem, the problem may have a ripple effect that causes other enterprise components to experience problems. Therefore, a conventional monitoring system receives enterprise events from enterprise components where many of the events are symptomatic events, i.e. generated and/or reported as a result of other, more fundamental problem events, rather than being root cause events, i.e. fundamental problem events. Distinguishing between symptomatic events and root cause events has historically been difficult, requiring skilled operators and significant time commitments.

Relationships and dependencies existing between hardware and software components within an enterprise computing environment lead to a single root cause producing symptomatic events that may confuse operators and delay the identification of, and therefore, the resolution of, the root problem. For example, a software component like a database management program depends on at least two hardware components, like a processor and a disk, to perform database management functions. Therefore, if either the disk or the processor experiences a problem, in addition to the disk and/or processor generating and reporting enterprise events, e.g., a disk write failure, the database management program is likely to generate and report enterprise events when database access attempts fail, e.g., a database write failure.

Systems and methodologies have been devised for determining the root cause of problems in complex data processing systems. For example, International Patent Publication No. WO 03/005200 A1 to Howell et al., entitled "Method and System for Correlating and Determining Root Causes of System and Enterprise Events," published Jan. 16, 2003, describes a method and system for correlating and determining root causes of enterprise events. The system and method described therein distinguishes between symptomatic events and root cause events based on the system's ability to establish a set correlation rules. The system includes a root cause determiner that receives events and initializes a timer that determines a period of time during which related events will be collected. Once the period of time has expired, a root cause determination can be made based on the set of collected events and correlation rules affected by such events.

As illustrated in the above exemplary known event management system, event management systems require that correlation rules be defined by the user so that root cause analysis can be performed. For example, with known event management systems, one event (E1) will be generated that states that DB2 has a problem on system ABC and another event (E2) may be generated that says that system ABC is unavailable. The event management system will get both events and may execute a pre-established user generated correlation rule that states that a system failure event is the root cause for any application failure events on the same system. As a result, root cause analysis will determine that system ABC is the root cause of the problem while DB2 having a problem is a symptomatic problem of system ABC being unavailable. This is but a simple example of the types of correlation rules that may be utilized. Much more complex rules may be created as the complexity of the system being managed increases.

Understanding the interaction of enterprise components is important in other management applications in addition to root cause analysis. By understanding the relationships between enterprise components, i.e. resources, the management system can better portray the existing computing environment to the user. Therefore, it would be beneficial to have a system and method for obtaining enterprise component relationship information for use by other management applications.

SUMMARY OF THE INVENTION

The present invention provides a system and method for using event management root cause analysis to depict resource dependencies. With the system and method of the present invention, since the root cause analysis of known event management systems provides a mechanism for defining interactions of enterprise components for root cause analysis purposes, this information is used as a basis for obtaining enterprise component relationship information that may be used by other management applications. That is, the present invention monitors the application of correlation rules to event notifications from various enterprise components and determines relationships of the various enterprise components based on the results of the application of the correlation rules. These relationships may then be stored in a data structure representing the system environment and may be used by other management systems or displayed to the user in a graphical format that graphically represents the system environment.

With the system and method of the present invention, a repository of resource information is maintained that identifies the resources of each managed element in the data processing system being managed. During event management, the event management system may receive events from one or more of these resources and may determine which correlation rules are affected by the events that are received. These correlation rules help to identify relationships between resources in the data processing system. These relationships may be mined to determine dependencies between resources for use in depicting the dependency structure of the data processing system.

The resulting data structure is a representation of the dependencies between resources in the data processing system. This data structure may be used by other management systems for performing other management operations and may be used to generate a graphical representation of the structure of the data processing system for output to a user.

These and other features and advantages of the present invention will be described in, or will become apparent to those of ordinary skill in the art in view of, the following detailed description of the preferred embodiments.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
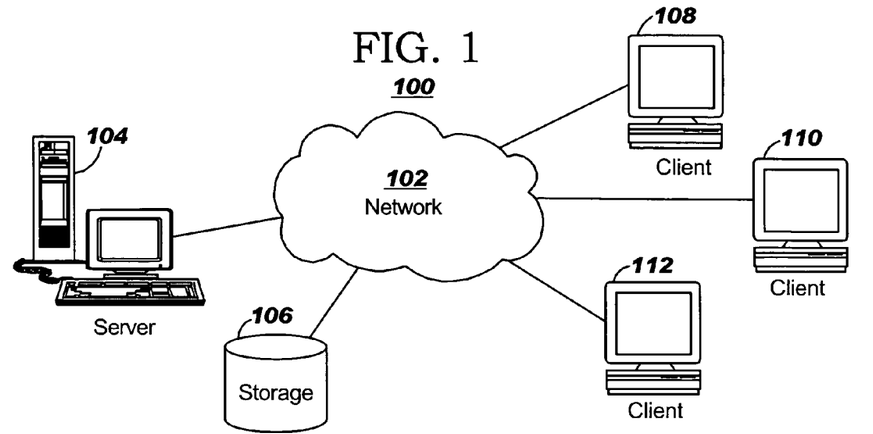
FIG. 1 is an exemplary diagram of a distributed data processing system in which aspects of the present invention may be implemented.
Figure 2:
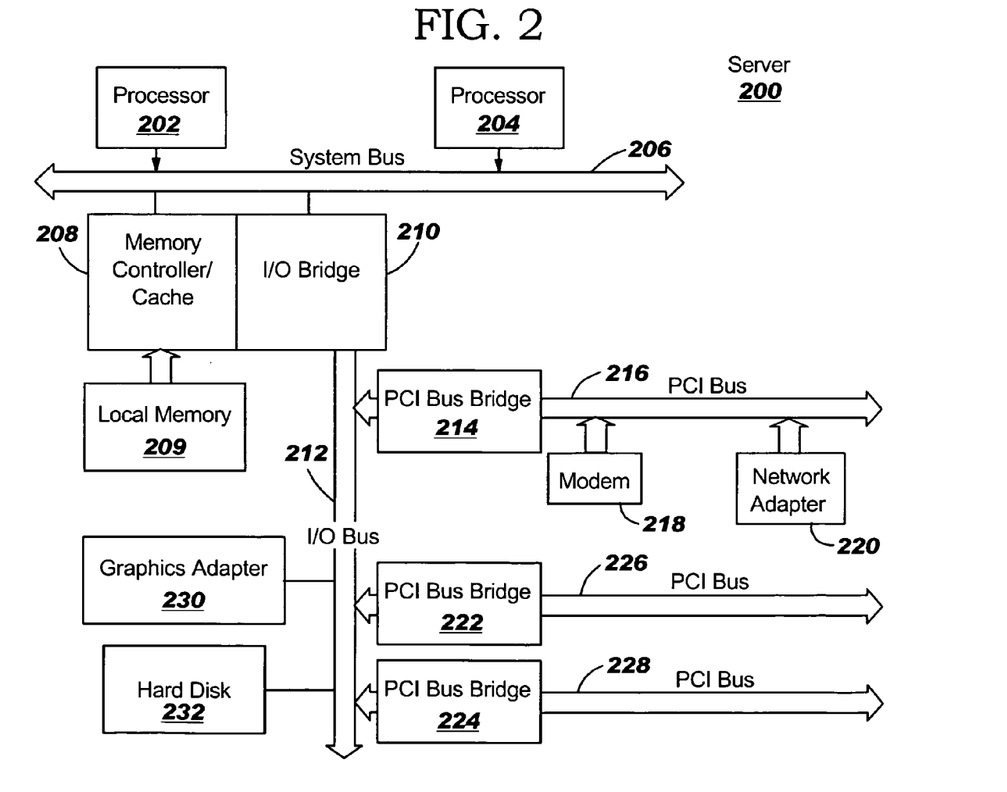
FIG. 2 is an exemplary diagram of a server computing device in which aspects of the present invention may be implemented.
Figure 3:
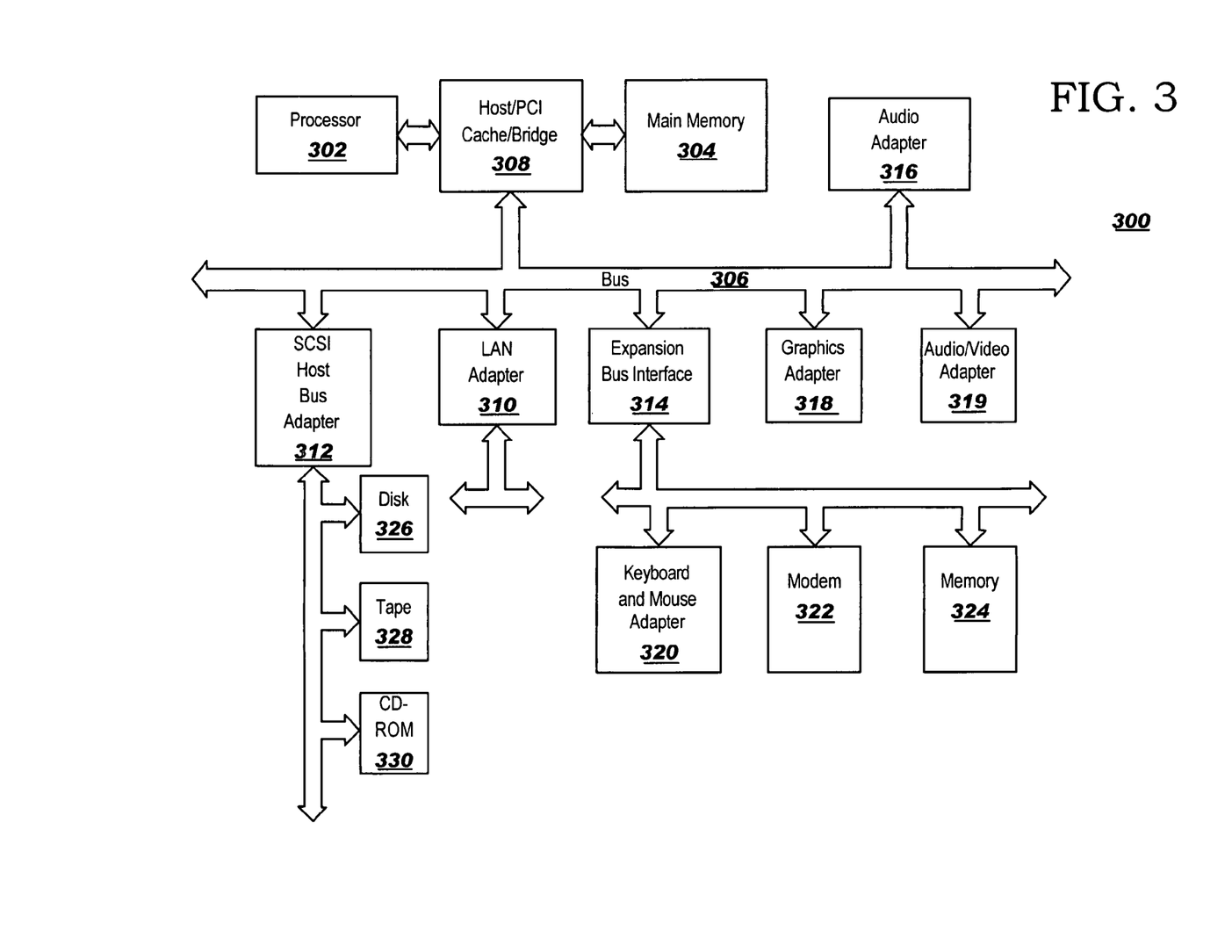
FIG. 3 is an exemplary diagram of a client computing device in which aspects of the present invention may be implemented.

The present invention is directed to a system and method for determining resource dependencies of a data processing system based on root cause analysis in an event management system. The present invention is preferably implemented in a distributed data processing system although it may also be implemented in a stand alone computing system as well. Therefore, the following FIGS. 1-3 are provided as an example data processing system and computing devices within the data processing system, in which aspects of the present invention may be implemented. FIGS. 1-3 are only exemplary and are intended to provide a context for the operations of the present invention discussed hereafter. It will be appreciated that no limitations to the particular data processing system or computing devices in which the present invention may be implemented are intended or implied by the depicted examples.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in connectors.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pSeries system, a product of International Business Machines Corporation in Armonk, N.Y., running the Advanced Interactive Executive (AIX) operating system or LINUX operating system.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows XP, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented programming system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interfaces. As a further example, data processing system 300 may be a personal digital assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

As discussed above, the present invention provides a mechanism for determining resource dependencies in a data processing system based on root cause analysis in event management systems. With the present invention, a repository of resource information is maintained that provides information about the managed resources, e.g. hardware and system resources, in the data processing system. The data processing system may be, for example, an enterprise system that includes one or more computing devices having various software and hardware resources, e.g., database applications, server applications, servlets, communication software, hard drives, network adapters, processors, memory, and the like. These software and hardware resources may also be referred to as enterprise components.

The resource information is used, along with event notification information from these resources, to determine a root cause of problems occurring within the data processing system. Part of this root cause analysis includes the application of correlation rules that correlates events from a plurality of resources, as is known in the art, to determine a root cause of the problems.

The root cause analysis of the event management system is monitored by the present invention to determine dependencies of resources based on the application of correlation rules affected by the generated events and the results of the application of these correlation rules to the resource generated events. These resources may be represented as an entry in a resource dependency data structure, such as a database for example, where each entry contains the resource's name, and a "depends-upon" relationship containing the name of zero or more resources that the current resource depends upon. In this manner, given a resource's name, a simple query will convey the list of resources it depends upon. One of these dependent resources could then be queried to see what it depends upon, and so on. This resource dependency data structure may then be used by other management systems and may be used to generate an output for representing the resource dependencies of the data processing system in a graphical form to a user.

Figure 4:
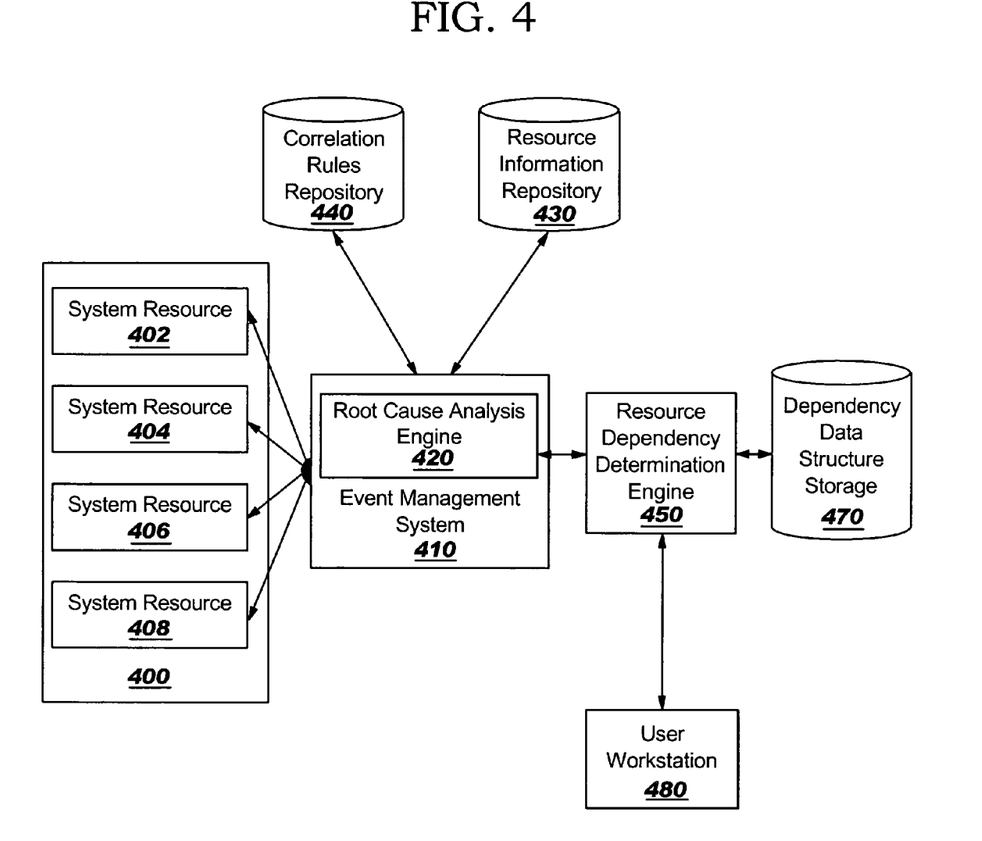
FIG. 4 is an exemplary diagram of the interaction of the primary operational components of one exemplary embodiment of the present invention.

FIG. 4 is an exemplary diagram of the interaction of the primary operational components of one exemplary embodiment of the present invention. As shown in FIG. 4, the present invention includes an event management system 410, such as IBM Tivoli's Enterprise Console or the like, which receives events from system resources 402-408 and performs root cause analysis on the events to determine a root cause of problems in the data processing system 400. The event management system 410 uses a root cause analysis engine 420 to perform root cause analysis on the events that are received from the system resources 402-408.

The root cause analysis engine 420 uses information about the resources 402-408, from which the events are received, which is obtained from the resource information repository 430. This resource information, along with the event information received with the event notifications from the system resources 402-408, is used to identify correlation rules in the correlation rules repository 440 that are affected by the events.

The correlation rules stored in the correlation rule repository 440 can comprise, for example, a number of components for expressions that can be evaluated to determine whether a set of values associated with a set of events indicated a likely root cause for a problem for a system resource in the data processing system 400. While a single correlation rule may provide a single data point for determining a root cause, aggregations of correlation rules can provide a set of data points that may provide a higher confidence level or a more sophisticated root cause determination.

The correlation rules that are affected by the events are retrieved by the root cause analysis engine 420 and are populated with resource and/or event information to determine a root cause of the problem associated with the event notifications received from the system resources 402-408.

For example, assume a first event is received indicating that a DB2 application has failed to write to a hard disk, a second event is received from the operating system of system ABC indicating a write operation was not able to complete, and a third event is received from the device driver associated with the hard disk drive indicating that a write to the hard disk failed, then the resources involved are the DB2 application, the operating system of system ABC, and the device driver of the hard disk drive. A first correlation rule may be established that states that if an input/output (I/O) event is received from both a DB2 application and the operating system of the system on which the DB2 application is implemented, then the root cause is the operating system on the system which implements the DB2 application. A second rule may be established that states that if an error event is received from both the operating system and a device driver associated with the operating system, then the root cause is the hardware device. By applying these rules to the above scenario, i.e. populating the correlation rules with information from the resource information repository and the event notifications, it can be determined that the root cause is most likely the hard disk drive (if it had been the operating system of system ABC, an event would not have been received from the device driver).

The populated rules, and the results from these rules, may be provided to the resource dependency determination engine 450 which analyzes these populated rules and results to determine resource dependencies. The determined resource dependencies are then converted to a resource dependency data structure format, such as a nodal tree representation, Extensible Markup Language (XML) document description, or the like. For example, with the above example scenario, a dependency relationship is discerned from the successful execution of root cause correlation rules since a correlation rule resulted in a DB2 event being deemed a symptom of an event against the operating system of system ABC, which in turn is inferred to be dependent upon the device driver and hardware of the hard disk drive since a different correlation rule deemed the operating systems' event as a symptom of an event against the hard drive. Thus, a dependency structure: DB2 application→OS system ABC→hard disk device driver→hard disk drive may be discerned from the correlation rules. This dependency may be converted to a resource dependency data structure in which the resources are represented as entries in the resource dependency data structure and the relationships between resources are designated as "depends-upon"/"supports" relationships, e.g., a parent/child relationship in a tree data structure embodiment.

The resource dependency data structures stored in the resource dependency data structure storage 470 may be maintained as separate resource dependency data structures or may be combined based on common entries in the various resource dependency data structures. If combined, a large resource dependency data structure may be generated that represents the dependencies of the various resources 402-408 in the data processing system 400. This large resource dependency data structure, or even the individual resource dependency data structures, may be output to the user workstation 480, or used by other management systems (not shown), for representing the dependencies of resources in the data processing system 400. For example, a graphical depiction of the dependencies of resources may be generated and provided via the user workstation 480. In this way, the user may be provided with greater insight as to how various resources in the data processing system 400 influence the operations of other resources.

With known root cause analysis mechanisms, event notifications are only used to denote in an event management system that a first event is a symptom of a second event so that the operator knows to focus diagnostic and recover time on the second event. For example, if a DB2 application on a server system ABC is sends a first event (E1) indicating some error or problem with the DB2 application, and a second event (E2) is generated by the system ABC stating that system ABC is unavailable, then it is determined that E1 is a symptom of E2.

The present invention expands upon this arbitrary intelligence that is expressed in correlation rules (arbitrary in that customers or vendors create as many rules as is necessary) by monitoring the application of these correlation rules to determine how the correlation rules are applied to events received from specific system resources. Based on the application of these correlation rules to specific events received from system resources, dependencies of system resources are automatically identified and a dependency architecture may be generated. In this way, a representation of the relationships between resources in a complex data processing system may be automatically generated and used by other management systems and/or output to a user.

Figure 5A:
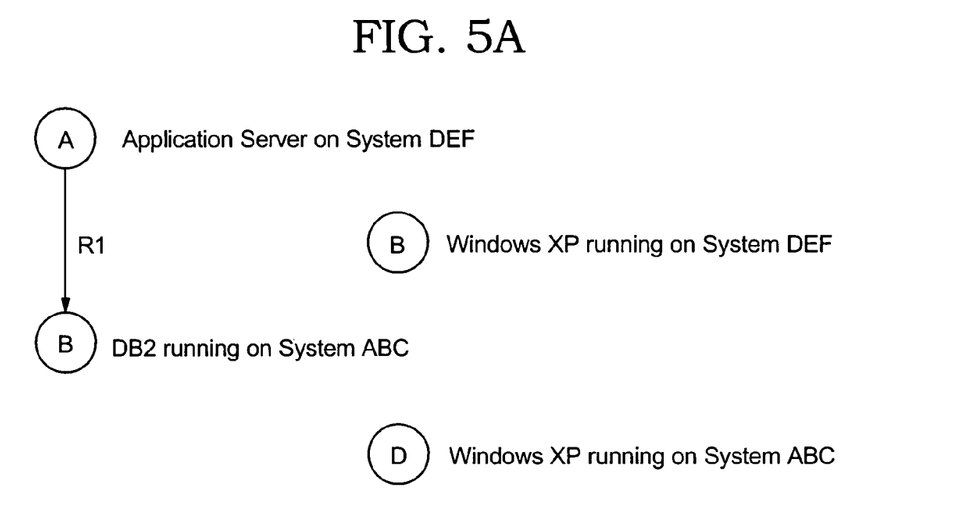
FIG. 5A is an exemplary diagram illustrating the manner by which resource dependencies may be determined using root cause analysis mining according to one exemplary embodiment of the present invention
Figure 5B:
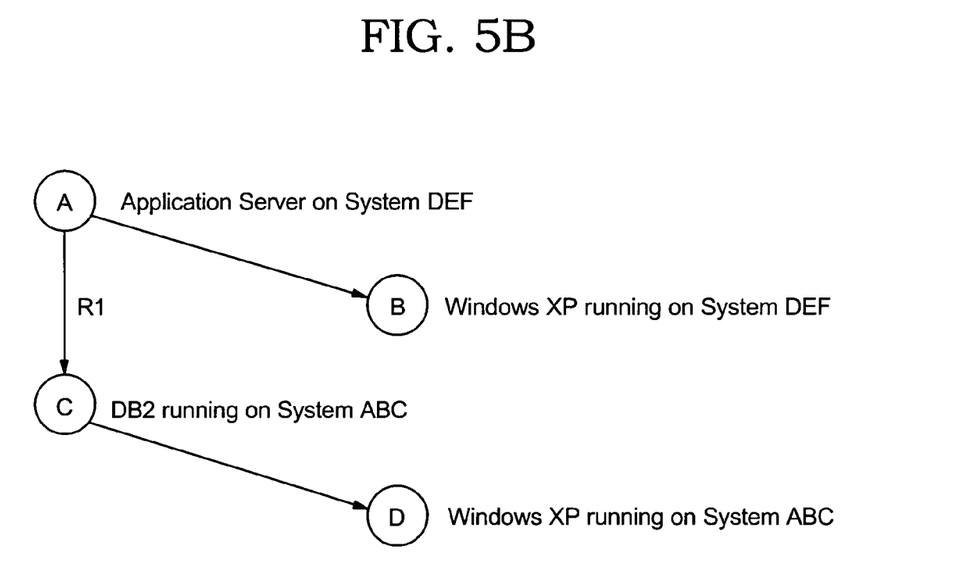
FIG. 5B is an exemplary diagram illustrating the manner by which resource dependencies determined from root cause analysis mining may be augmented by dependency rules in accordance with one exemplary embodiment of the present invention.

A systems administrator or other user may need to view which enterprise components comprise a given business service, such as Online Banking. FIGS. 5A and 5B are exemplary diagrams illustrating the manner by which resource dependencies may be determined using root cause analysis mining according to one exemplary embodiment of the present invention to facilitate defining a business service. As shown in FIG. 5A, in the known systems for identifying dependencies between resources, a system administrator or other user must define a new service, e.g. Online Banking, and then manually identify the fact that this new service is comprised of resources A and C and that resource A is dependent upon C via the relationship R1. The administrator may not even know to include other resources that A and c depend upon, such as B and D. Therefore, the view of this new service will be incomplete and will require a high degree of maintenance to keep it up to date.

With the present invention, the relationship between A and C may be automatically identified from the application of correlation rules to events during root cause analysis of an event management system. That is, when the application server on system DEF (represented as node A) sends an event to the event management system indicating a problem, and the DB2 application running on system ABC sends an event to the event management system indicating a problem, these two events may be correlated using the correlation rules that are pre-established for the root cause analysis engine of the event management system.

Such a root cause analysis correlation rule may state that if an event is received from both an application server instance on a first system and a database application on a second system, that the root cause of the problem is most likely the database application on the second system. This relationship between these two resources is labeled R1 and may be determined by the resource dependency determination engine 450 in the manner previously described. The result would be a resource dependency data structure that may be depicted in the manner shown in FIG. 5A with two nodes A and C representing the two system resources, and the edge R1 representing the dependency relationship.

The edge R1 may be represented in the actual data structure as "depends-upon"/"supports" relationship identifiers in a table data structure. For example, a first column of a resource dependency data structure may represent the name of the resource, a second column of the resource dependency data structure may represent any resources the current resource supports, and a third column of the resource dependency data structure may represent any resources the current resource depends upon.

At the point in time shown in FIG. 5A, the dependencies of nodes B and D with regard to nodes A and C may not be yet known since no events have been generated with regard to nodes B and D. At some later time, however, as illustrated in FIG. 5B, events may be generated by the system resources represented by nodes A, B, C and D that cause other relationships between resources to be identified based on the application of correlation rules to event and system resource information. For example, based on a further event, the relationship R2 between the DB2 application represented by node C and the operating system represented by node D may be identified. Similarly, another event may result in the relationship R3 between nodes A and B being identified.

In this way, the resource dependency data structure representing the relationships between system resources may be built up over time based on the application of root cause analysis correlation rules to events and resource information. More importantly, in the example discussed earlier when defining a new service, such as an online banking service, an administrator only needs to identify one of these resources as being a part of the service. The dependency relationships that are being automatically discovered may be traversed to automatically associate the other resources with this service. An option that can be made available is to designate how far to recursively follow these dependency relationships. That is, automatic discovery of system resource dependencies may be recursively performed until a predetermined level of dependency is achieved.

Figure 6:
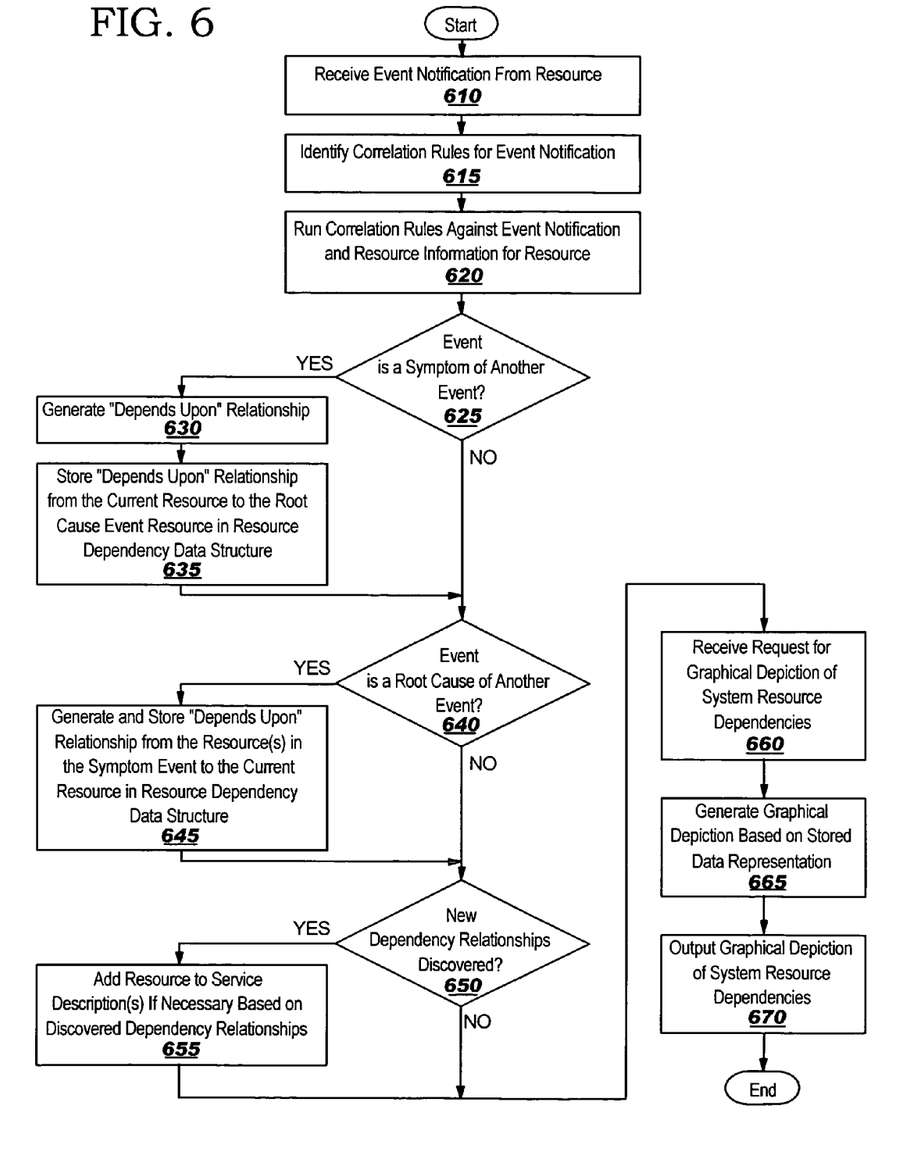
FIG. 6 is a flowchart outlining an exemplary overall operation for determining and depicting dependencies between resources in a data processing system according to one exemplary embodiment of the present invention.

FIG. 6 is a flowchart outlining an exemplary operation of determining dependencies between resources in a data processing system in accordance with an exemplary embodiment of the present invention. It will be understood that each block of the flowchart illustration, and combinations of blocks in the flowchart illustration, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustration support combinations of means for performing the specified functions, combinations of steps for performing the specified functions and program instruction means for performing the specified functions. It will also be understood that each block of the flowchart illustration, and combinations of blocks in the flowchart illustration, can be implemented by special purpose hardware-based computer systems which perform the specified functions or steps, or by combinations of special purpose hardware and computer instructions.

FIG. 6 is a flowchart outlining an exemplary overall operation for determining and depicting dependencies between resources in a data processing system according to one exemplary embodiment of the present invention. As shown in FIG. 6, the operation starts by receiving an event notification from a resource (step 610). Correlation rules that are appropriate for the event notification are then determined (step 615). The identified correlation rules are then run against the event notification and resource information associated with the resource that generated the event notification (step 620).

The outcome of the correlation rules are then examined (step 625) to see if the event was correlated as a symptom of another event or events. If so, a "depends upon" relationship is created (step 630) from the current resource to the one identified in the root cause event and stored in a resource dependency data structure (step 635).

The outcome of the correlation rules are then examined (step 640) to determine if the event was correlated as a root cause of another event or events. If so, a "depends upon" relationship from the resource(s) identified in the symptom event(s) to the current resource is created and stored in a resource dependency data structure (step 645). If any dependency relationships have been discovered (step 650), then the system will evaluate whether or not the new dependencies should cause a resource or resources to be added to a service description, for example, Online Banking, and adds these resources to a service description if necessary (step 655).

Upon receipt of a request for a graphical representation of the system resource dependencies (step 660), a graphical depiction of the system resource dependencies is generated based on the stored data representation (step 665). The graphical depiction is then output to a user workstation (step 670) and the operation terminates.

Thus, the present invention provides an automated mechanism for determining system resource dependencies such that a graphical representation and/or data structure representation may be generated. The present invention makes use of the application of correlation rules in known event management system root cause analysis mechanisms to determine the dependencies of system resources. Thus, the present invention does not require any modifications to the system resources or the event management system to operate. Furthermore, the present invention discovers relationships between system resources during normal operation of the event management system and may build up a representation of the system resource dependencies over time.

Additionally, in a further embodiment of the present invention, dependencies may also dissolve over time as the resources are removed from the enterprise and/or reconfigured. To compensate for this dynamic nature of the resources, a relationship that is automatically discovered may be removed from the system if correlation logic has not observed and revalidated the dependency within a given period of time, e.g., a month, a year, etc. For example, after a given period of time, the above resource dependency relationship discovery mechanisms may be performed again to determine if changes in the dependency relationships have occurred. If a resource dependency data structure has a relationship in it that is not discovered during this updated resource dependency relationship discovery operation, then this relationship may be removed from the resource dependency data structure. Thus, the present invention may be used to verify resource dependencies from time to time and automatically update these dependencies either by adding resources or removing resources, to reflect the current allocation of resources.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system, for determining system resource dependencies, comprising:

receiving a first event notification from a first system resource;

performing root cause analysis on the first event notification from the first system resource, wherein performing root cause analysis on the first event notification includes applying one or more correlation rules to information in the first event notification;

identifying one or more dependency relationships between the first system resource and a plurality of other system resources based on the application of the one or more correlation rules to the information in the first event notification, wherein identifying one or more dependency relationships is recursively performed until a predetermined level of dependency corresponding to the plurality of other system resources is achieved, wherein a second system resource is one of the plurality of other system resources, the identifying step further comprising:

determining whether a first event that caused the first event notification is a symptom of a second event that caused a second event notification received from the second system resource;

responsive to determining that the first event that caused the first event notification is a symptom of the second event that caused the second event notification received from the second system resource, generating a first dependency relationship representation in a dependency data structure, wherein the first dependency relationship representation identifies the first system resource as being dependent upon the second system resource;

otherwise, determining whether the first event that caused the first event notification is a root cause of the second event that caused the second event notification received from the second system resource; and responsive to determining that the first event that caused the first event notification is a root cause of the second event that caused the second event notification received from the second system resource, generating a second dependency relationship representation in the dependency data structure, wherein the second dependency relationship representation identifies the second system resource as being dependent upon the first system resource;

generating an output based on the identified one or more dependency relationships between the first system resource and the plurality of other system resources, wherein the output is a graphical representation of the identified one or more dependency relationships between the first system resource and the plurality of other system resources; and adding the first system resource to at least one service description based on the identified one or more dependency relationships between the first system resource and the plurality of other system resources.

2. A computer program product comprising a computer recordable-type medium having computer instructions executable by a processor for determining system resource dependencies, the computer program product comprising:

first instructions for receiving a first event notification from a first system resource;

second instructions for performing root cause analysis on the first event notification from the first system resource, wherein performing root cause analysis on the first event notification includes applying one or more correlation rules to information in the first event notification;

third instructions identifying one or more dependency relationships between the first system resource and a plurality of other system resources based on the application of the one or more correlation rules to the information in the first event notification, wherein identifying one or more dependency relationships is recursively performed until a predetermined level of dependency corresponding to the plurality of other system resources is achieved, wherein a second system resource is one of the plurality of other system resources, the third instructions further comprising:

fourth instructions for determining whether a first event that caused the first event notification is a symptom of a second event that caused a second event notification received from the second system resource;

fifth instructions for responsive to determining that the first event that caused the first event notification is a symptom of the second event that caused the second event notification received from the second system resource, generating a first dependency relationship representation in a dependency data structure, wherein the first dependency relationship representation identifies the first system resource as being dependent upon the second system resource;

sixth instructions for determining whether the first event that caused the first event notification is a root cause of the second event that caused the second event notification received from the second system resource; and seventh instructions for responsive to determining that the first event that caused the first event notification is a root cause of the second event that caused the second event notification received from the second system resource, generating a second dependency relationship representation in the dependency data structure, wherein the second dependency relationship representation identifies the second system resource as being dependent upon the first system resource;

eighth instructions for generating an output based on the identified one or more dependency relationships between the first system resource and the plurality of other system resources, wherein the output is a graphical representation of the identified one or more dependency relationships between the first system resource and the plurality of other system resources; and ninth instructions for adding the first system resource to at least one service description based on the identified one or more dependency relationships between the first system resource and the plurality of other system resources.

3. A data processing system for determining system resource dependencies, the data processing system comprising:
- means for receiving a first event notification from a first system resource;
- means for performing root cause analysis on the first event notification from the first system resource, wherein performing root cause analysis on the first event notification includes applying one or more correlation rules to information in the first event notification;
- means for identifying one or more dependency relationships between the first system resource and a plurality of other system resources based on the application of the one or more correlation rules to the information in the first event notification, wherein identifying one or more dependency relationships is recursively performed until a predetermined level of dependency corresponding to the plurality of other system resources is achieved, wherein a second system resource is one of the plurality of other system resources, the identifying means further comprising:
    - means for determining whether a first event that caused the first event notification is a symptom of a second event that caused a second event notification received from the second system resource;
    - means for generating a first dependency relationship representation in a dependency data structure, wherein the first dependency relationship representation identifies the first system resource as being dependent upon the second system resource, responsive to determining that the first event that caused the first event notification is a symptom of the second event that caused the second event notification received from the second system resource;
    - means for determining whether the first event that caused the first event notification is a root cause of the second event that caused the second event notification received from the second system resource; and
    - means for generating a second dependency relationship representation in the dependency data structure, wherein the second dependency relationship representation identifies the second system resource as being dependent upon the first system resource, responsive to determining that the first event that caused the first event notification is a root cause of the second event that caused the second event notification received from the second system resource;
- means for generating an output based on the identified one or more dependency relationships between the first system resource and the plurality of other system resources, wherein the output is a graphical representation of the identified one or more dependency relationships between the first system resource and the plurality of other system resources; and
- means for adding the first system resource to at least one service description based on the identified one or more dependency relationships between the first system resource and the plurality of other system resources.

* * * * *